June 18, 1935.  F. H. MUNTZEL  2,005,044
AGRICULTURAL IMPLEMENT
Original Filed Sept. 15, 1933
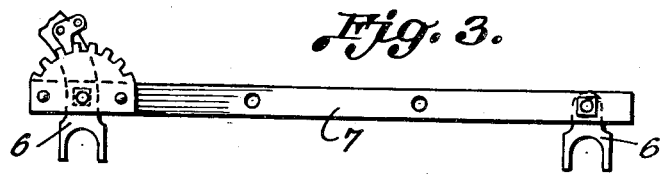
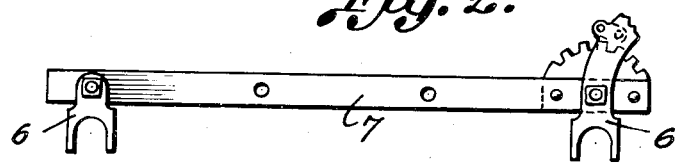
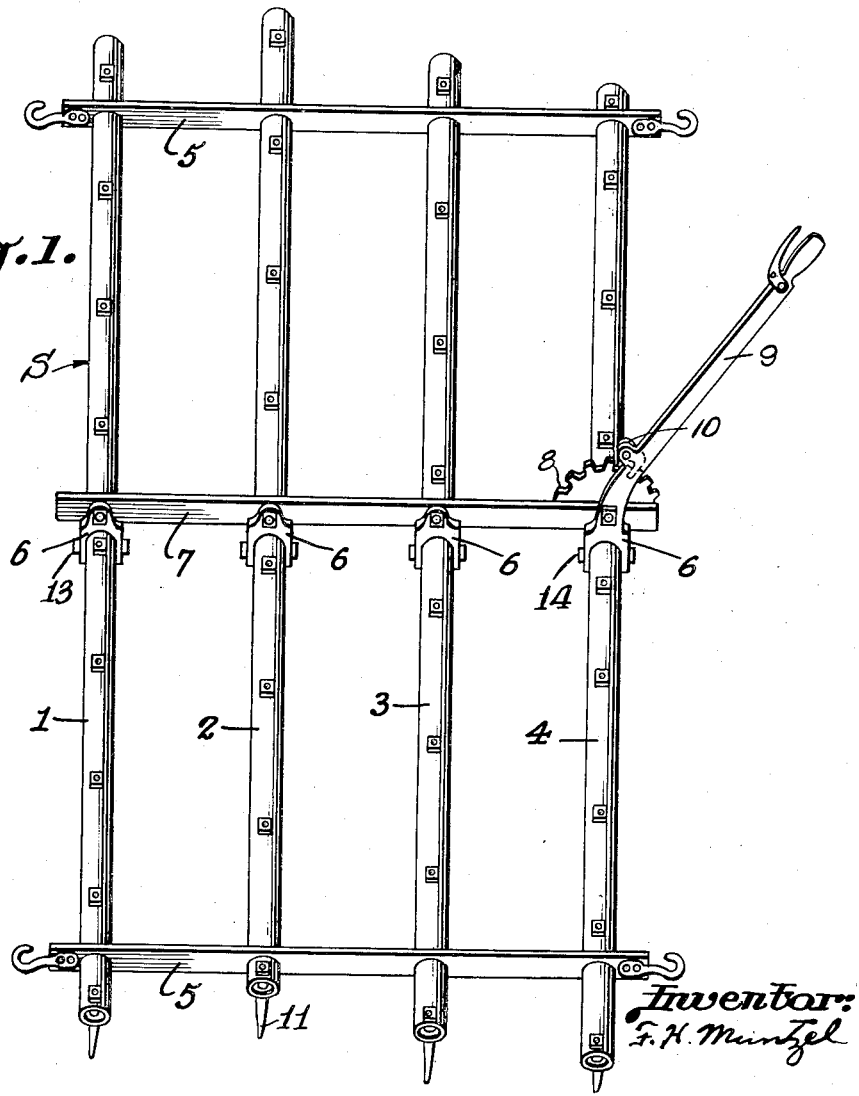
Inventor:
F. H. Muntzel Patented June 18, 1935

2,005,044

UNITED STATES PATENT OFFICE 2,005,044

AGRICULTURAL IMPLEMENT

Frederick H. Muntzel, Boonville, Mo.

Refiled for abandoned application Serial No. 693,117, September 15, 1933. This application November 19, 1934, Serial No. 753,776

1 Claim. (Cl. 55—103)

The present invention appertains to new and useful improvements in harrows and more particularly to harrows of the tooth type. The principal complaint made by farmers using this type of harrow is that the teeth will track or trail after the braces become loose, bent or broken, which defects start to occur quite frequently after the implement has been employed for one or more seasons.

The principal object of the present invention is to provide a harrow wherein the teeth on the tooth bar of each harrow section are differently spaced so that no two teeth on the same section will travel on a line with any preceding teeth, thus eliminating tracking and trailing now common in present types of harrows.

Another important object of the invention is to provide a harrow having parts thereof reversibly attached so that when the harrow teeth are worn at one side the harrow section can be reversed.

These and various other important objects and advantages of the invention will become apparent to the reader of the following specification.

In the drawing:

Figure 1 represents a perspective view of a harrow section.

Figure 2 represents a side elevational view of the tiltable bar detached from the toothed bar.

Figure 3 represents a side elevational view of the tiltable bar shown reversed.

Referring to the drawing wherein like numerals designate like parts, it can be seen that numeral 5—5 represents the end straps through which the toothed bars 1, 2, 3 and 4 have their ends disposed.

Adjacent the intermediate portion of each toothed bar 2 is a yoke 6, the upper portion of which is pivotally connected to the tiltable bar 7 and has one end provided with a rack 8. The yoke 6 on the rear bar 4 is provided with a hand lever extension 9 equipped with a detent 10 engageable with the rack 8.

The teeth of the harrow are preferably of the type which are shouldered adjacent their upper ends and from thereon reduced to provide portions which can extend through the bars 1, 2, 3, and 4 and which are provided with threads at their upper ends to accommodate nuts.

These teeth which are referred to by numeral 11 are arranged in different spaced relation. In other words the teeth are to be spaced on the bars so that no two teeth rearwardly through the harrow will be on the same line, thus eliminating tracking of the teeth.

It will be observed that when the teeth are worn on one side, instead of removing the teeth and reversing the same, or replacing the teeth with new ones, the tiltable bar 7 can be bodily taken off of the section S shown in Figure 1 and reversed to the position shown in Figure 3, replaced in a manner requiring but little time and effort.

It will further be seen that in order for the tiltable bar 7 to properly fasten when reversed, it is necessary that the bolt 13 must be perpendicular to the tiltable bar. Furthermore the bolt 14 must be perpendicular to the toothed bar when the teeth are in a vertical position.

While the foregoing specification sets forth the invention in specific terms, it is to be understood that numerous changes in the shape, size and materials may be resorted to without departing from the spirit or scope of the invention as claimed hereinafter.

Having described the invention, what is claimed as new is:

In a harrow, a plurality of bars provided with depending teeth out of trailing alinement with respect to each other, end bars through which the toothed bars are rotatably disposed, an upstanding yoke on each of the toothed bars, a connecting member to which the upper ends of the yokes are pivotally connected, one of said yokes being provided with an upstanding hand lever, said connecting member being provided with a rack, and a detent on the lever for engagement with said rack.

FREDERICK H. MUNTZEL.